United States Patent
Cassotti

(10) Patent No.: US 11,174,888 B2
(45) Date of Patent: Nov. 16, 2021

(54) THREADED PIN

(71) Applicant: MR INDUSTRIAL FASTENERS S.r.l., Treviolo (IT)

(72) Inventor: Alessandro Cassotti, Treviolo (IT)

(73) Assignee: MR INDUSTRIAL FASTENERS S.r.l., Treviolo (IT)

( * ) Notice: Subject to any disclaimer, the term of this patent is extended or adjusted under 35 U.S.C. 154(b) by 84 days.

(21) Appl. No.: 16/628,700

(22) PCT Filed: Jul. 10, 2018

(86) PCT No.: PCT/IB2018/055059
§ 371 (c)(1),
(2) Date: Jan. 6, 2020

(87) PCT Pub. No.: WO2019/012410
PCT Pub. Date: Jan. 17, 2019

(65) Prior Publication Data
US 2020/0182283 A1    Jun. 11, 2020

(30) Foreign Application Priority Data

Jul. 10, 2017    (IT) .......................... 102017000077422

(51) Int. Cl.
*F16B 35/04*    (2006.01)
(52) U.S. Cl.
CPC ................... *F16B 35/044* (2013.01)
(58) Field of Classification Search
CPC .................................................. F16B 35/044
USPC ......................................................... 411/411
See application file for complete search history.

(56) References Cited

U.S. PATENT DOCUMENTS

| 5,609,455 | A | * | 3/1997 | McKewan | ............ F16B 35/047 411/386 |
| 6,062,786 | A | * | 5/2000 | Garver | .................. F16B 35/047 411/386 |
| 6,158,938 | A | | 12/2000 | Savoji | |
| 6,296,432 | B1 | * | 10/2001 | Kato | ..................... F16B 35/044 411/386 |

(Continued)

FOREIGN PATENT DOCUMENTS

| FR | 2697875 A1 | 5/1994 |
| JP | 2002195230 A | 7/2002 |

OTHER PUBLICATIONS

International Search Report, issued in PCT/IB2018/055059, dated Nov. 6, 2018, Rijswijk, Netherlands.

*Primary Examiner* — Gary W Estremsky
(74) *Attorney, Agent, or Firm* — Arent Fox LLP; Michael Fainberg

(57) ABSTRACT

A threaded pin comprises a threaded cylindrical stem that extends between a proximal stem end and a distal stem end, and a coupling end portion that extends from the distal stem end. In the coupling end portion, at least one annular groove is formed, which is distally delimited by a distal annular ridge that defines a maximum outer diameter of the coupling end portion. The maximum outer diameter of the coupling end portion is smaller than the inner diameter of the threaded cylindrical stem in such a way that the coupling end portion may be inserted with play into a threaded hole wherein the threaded pin may be screwed, the distal annular ridge being suitable for insertion between the ridges of the female thread of the threaded hole.

10 Claims, 8 Drawing Sheets

(56) References Cited

U.S. PATENT DOCUMENTS

| | | | |
|---|---|---|---|
| 6,533,790 B1 * | 3/2003 | Liu | A61B 17/863 411/386 |
| 6,561,741 B2 * | 5/2003 | Garver | F16B 35/047 411/263 |
| 6,685,411 B2 * | 2/2004 | Kato | F16B 33/02 411/386 |
| 6,764,263 B2 * | 7/2004 | Carlo | B21H 3/027 411/386 |
| 6,796,761 B2 * | 9/2004 | Mizuno | F16B 35/047 411/386 |
| 6,910,841 B2 * | 6/2005 | Isenberg | F16B 25/0015 411/386 |
| 7,866,930 B2 * | 1/2011 | Murase | F16B 35/047 411/386 |
| 8,197,170 B2 * | 6/2012 | Wagner | F16B 35/047 411/386 |
| 8,632,288 B2 * | 1/2014 | Konagaya | F16B 35/047 411/386 |
| 9,835,193 B2 * | 12/2017 | Pritchard | F16B 35/047 |
| 2010/0068003 A1 | 3/2010 | Wagner | |

* cited by examiner

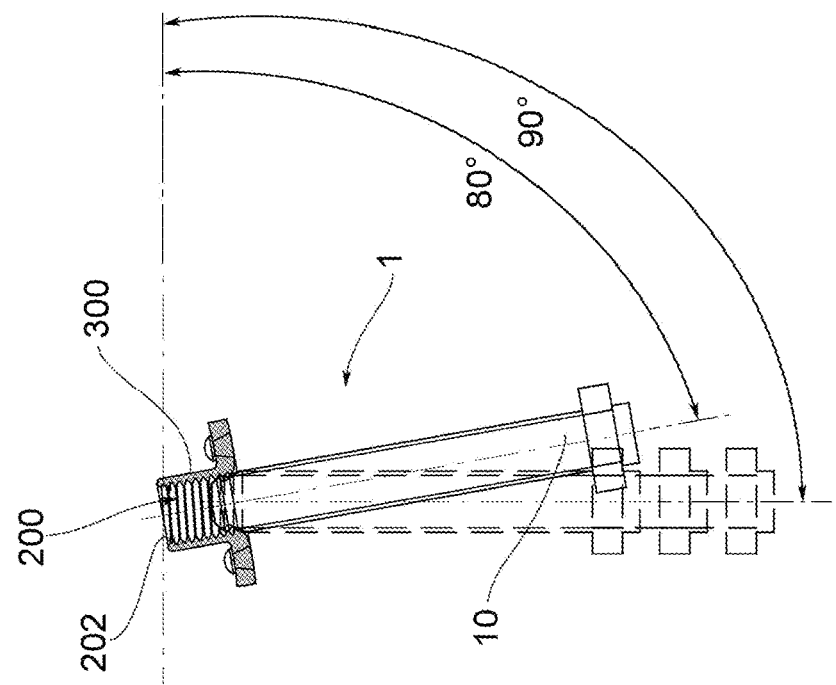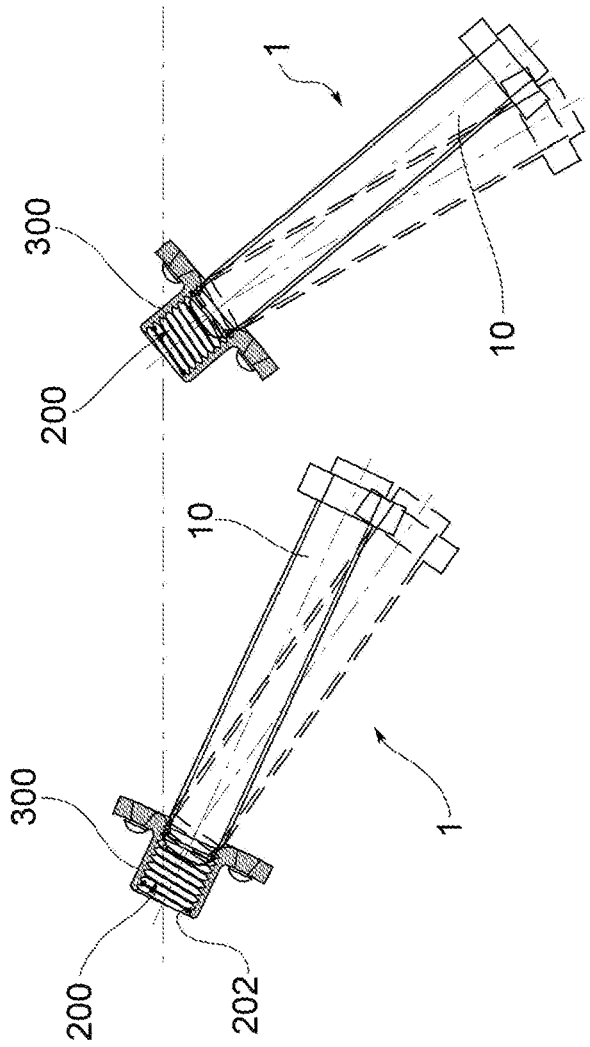

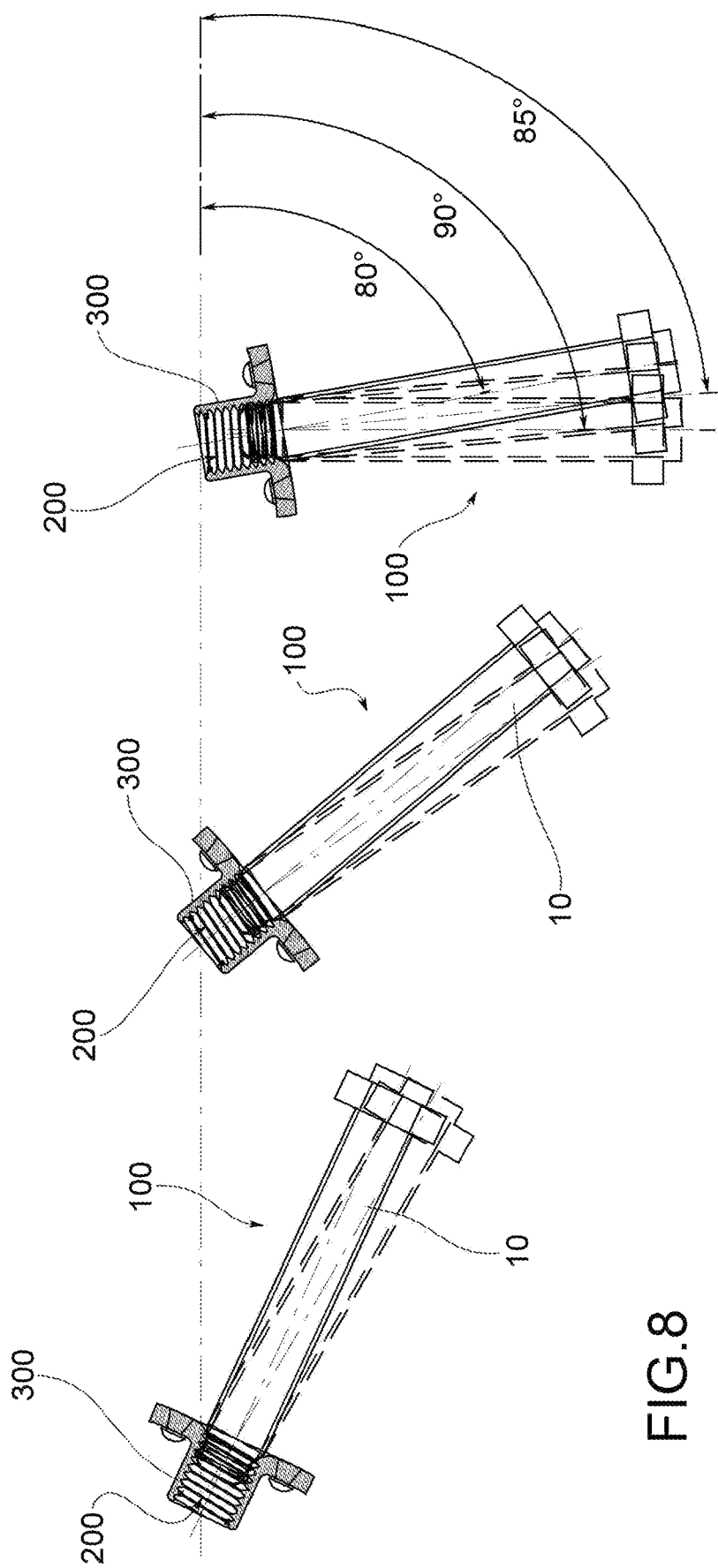

Ouï

THREADED PIN

CROSS-REFERENCE TO RELATED APPLICATIONS

This application is a National Phase Application of PCT International Application No. PCT/M2018/055059, having an International Filing Date of Jul. 10, 2018 which claims priority to Italian Application No. 102017000077422 filed Jul. 10, 2017, each of which is hereby incorporated by reference in its entirety.

FIELD OF THE INVENTION

The present invention concerns a threaded pin.

A threaded pin is provided with a threaded stem suitable for screwing into a threaded hole, i.e. a hole in the wall of which there is a female thread suitable for coupling with the threaded stem, which acts as a screw.

Typically, the threaded stem is cylindrical in shape and the thread is helical.

BACKGROUND OF THE INVENTION

In some applications, for example in automated assembly lines, a threaded pin is initially pre-screwed into a threaded hole, for example using a robot arm, so that a simple connection of the pin to the threaded hole may be made. The actual screwing operation is then carried out later.

Due to vibrations of the part bearing the threaded hole, or following changes in the position thereof, it may happen that the pin, if barely screwed into the hole, becomes unscrewed and then falls out.

If possible, in order to remedy such an inconvenience, the pin is pre-screwed more deeply into the threaded hole, but this leads to a greater complexity of the machine that must carry out the pre-screwing and an increase in assembly times.

SUMMARY OF THE INVENTION

The object of the present invention is to propose a threaded pin capable of overcoming the problems cited above.

Specifically, the object of the present invention is to provide a threaded pin that is designed to remain attached to the threaded hole even in the absence of coupling between the thread of the threaded stem and the female thread of the threaded hole.

Said object is achieved by a threaded pin according to claim 1 having the features described and claimed herein. Preferred embodiments of the invention are also described.

BRIEF DESCRIPTION OF THE DRAWINGS

The features and advantages of the threaded pin according to the invention will, however, become evident from the description hereinafter of the preferred example embodiments thereof, provided by way of indicative and non-limiting examples, with reference to the accompanying figures, wherein:

FIGS. 4-4b illustrate the component pin assembly with a threaded hole in three different angular positions with respect to the horizontal axis;

FIGS. 8-8b show the component pin assembly with a threaded hole in three different angular positions with respect to the horizontal axis.

DETAILED DESCRIPTION

Figure 1:
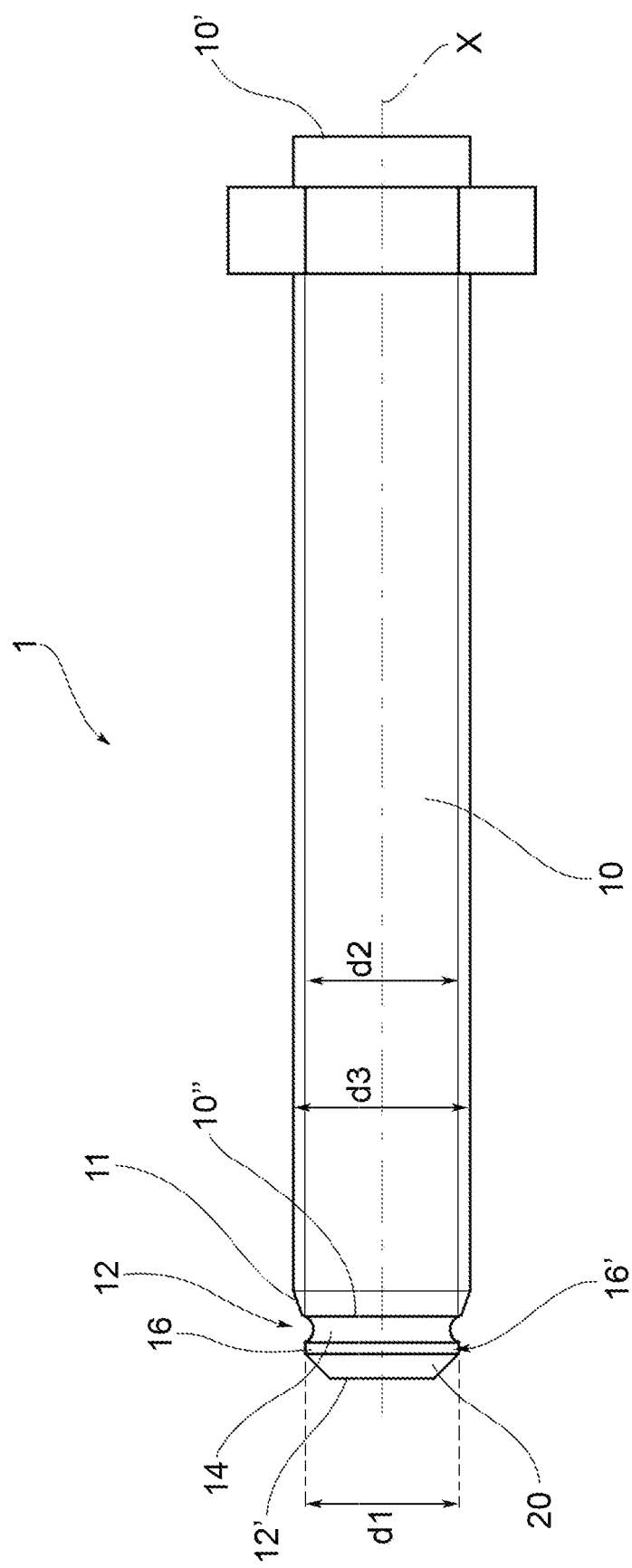
FIG. 1 is a side view of the threaded pin according to the invention, in a first embodiment.

In said drawings, a threaded pin according to the invention has been indicated collectively at 1; 100.

In the following description, elements common to the various embodiments represented in the drawings are indicated at the same numeric references.

In a general embodiment, the pin 1; 100 comprises a threaded cylindrical stem 10 that extends around a pin axis X between a proximal stem end 10' and a distal stem end 10".

The threaded cylindrical rod 10 is suitable for screwing into a threaded hole 200 made in a female component 300.

The threaded pin 10 also comprises a coupling end portion 12 that extends from the distal stem end 10". At least one annular groove 14 is formed in this coupling end portion 12.

The first annular groove 14 is delimited distally by a distal annular ridge 16 which defines the maximum outer diameter $d_1$ of the coupling end portion 12. Such maximum outer diameter $d_1$ of the coupling end portion 12 is less than the inner diameter $d_2$ of the threaded cylindrical stem 10 in such a way that the coupling end portion 12 is insertable with play into the threaded hole 200 wherein the threaded pin 1; 100 may be screwed.

The inner diameter $d_2$ of the threaded cylindrical stem 10 means the diameter defined by the bottom of the thread of the stem, in contrast to the outer diameter $d_3$, defined by the ridges of the thread.

The insertion "with play" in the threaded hole 200 means that the maximum outer diameter $d_1$ of the coupling portion 12 is smaller than the hole diameter $d_4$ of the threaded hole defined by the ridges 202 of the female thread obtained in the wall of the threaded hole 200. Therefore, the distal annular ridge 16 is free to enter the threaded hole 200 without interfering with the ridges 202 of the female thread.

Moreover, the distal annular ridge 16 is suitable for insertion between the ridges 202 of the female thread of the threaded hole 200. In other words, at least one peripheral annular portion of the distal annular ridge 16 has a thickness in the axial direction less than the distance between the ridges 202 of the female thread.

In an embodiment shown in FIGS. 1-4b, the threaded pin 1 has only one annular groove 14.

In the variant embodiment illustrated in FIGS. 5-8b, in the coupling end portion 12, two consecutive annular grooves 14, 15 are made.

Obviously, the coupling end portion 12 could have a larger axial extension and also have a larger number of annular grooves.

Where there are several annular grooves 14, 15, the consecutive annular grooves are separated by an intermediate annular ridge 18 having an outer diameter equal to or smaller than the outer diameter $d_3$ of the distal annular ridge 16.

For example, all the annular grooves 14, 15 have the same depth.

For example, each annular groove 14, 15 has a semicircular profile.

In a preferred embodiment, the annular grooves 14, and the annular ridges 16, 18 of the coupling end portion 12 extend perpendicularly to the pin axis X.

In one embodiment, the coupling end portion 12 has a distal end 12' that connects to the distal annular ridge 16 through a conical surface 20.

For example, the conical surface 20 is inclined by 45° with respect to the pin axis X.

In one embodiment, the distal end 12' of the coupling end portion 12 is defined by a flat wall, perpendicular to the pin axis X.

In one embodiment, the distal annular ridge 16 forms a cylindrical outer surface 16'.

More specifically, such cylindrical outer surface 16' of the distal annular ridge 16 has an axial extension greater than the axial extension of the intermediate annular ridges 18. As will be described hereinafter, in effect, the distal annular ridge 16 must be strong enough to withstand any stresses acting on the pin when such distal ridge 16 is engaged between the ridges 202 of the female thread and the threaded stem 10 is not yet screwed into the threaded hole 200.

In one embodiment, the annular groove 15 closest to the threaded stem 10 is delimited by the distal stem end 10". In other words, the threaded stem 10 ends with a distal wall orthogonal to the pin axis X, which forms a shoulder from which extends the annular groove.

In one embodiment, the outer diameter $d_3$ of the threaded stem 10 is progressively reduced near the distal stem end 10". For example, the threading envelope forms distally a conical surface 11 at an angle of approximately 20° with respect to the pin axis X.

Therefore, with particular reference to FIGS. 2, 2a and 6, 6a, considering the threaded hole 200 oriented with the horizontal hole axis, when the coupling end portion 12 is inserted in the threaded hole 200 and in the absence of screwing between the thread of the threaded pin and the female thread of the threaded hole, due to the play between the coupling portion 12 and the threaded hole 200, the threaded pin is free to tilt with respect to the horizontal hole axis, leaning on the lower part of the mouth of the threaded hole 200 and causing the insertion of the upper part of the distal annular ridge 16 between two ridges 202 of the female thread. The threaded pin 1; 100 is thus firmly coupled to the female component 300 wherein is made the threaded hole 200 even in the absence of screwing.

Figure 2:
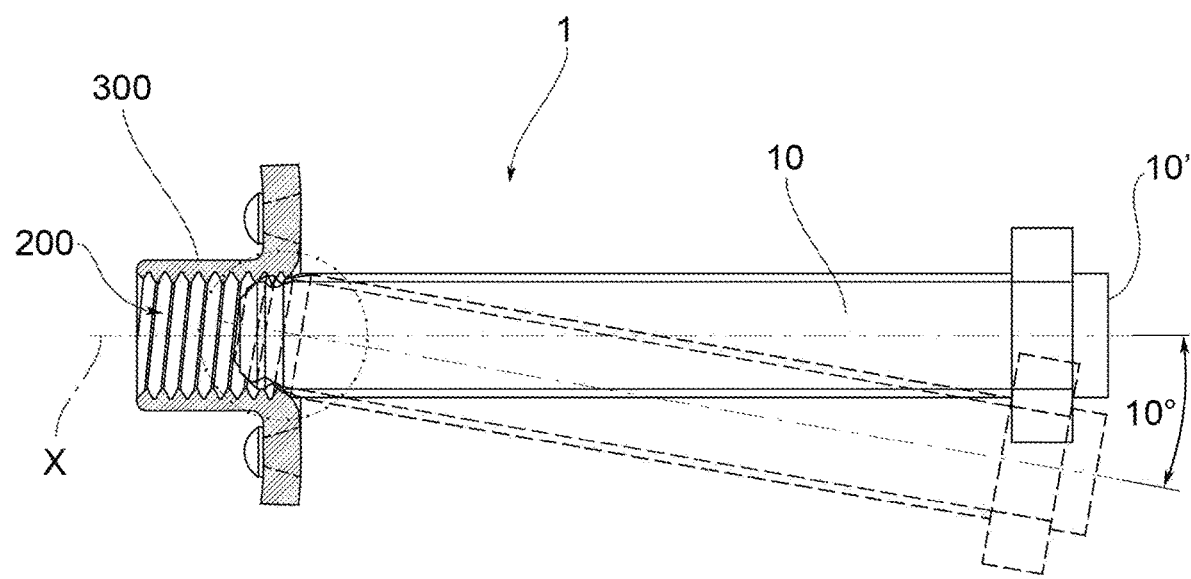
FIG. 2 shows the threaded pin coupled to a component wherein a threaded hole is made, in the absence of screwing between the threaded pin and the threaded hole.
Figure 2A:
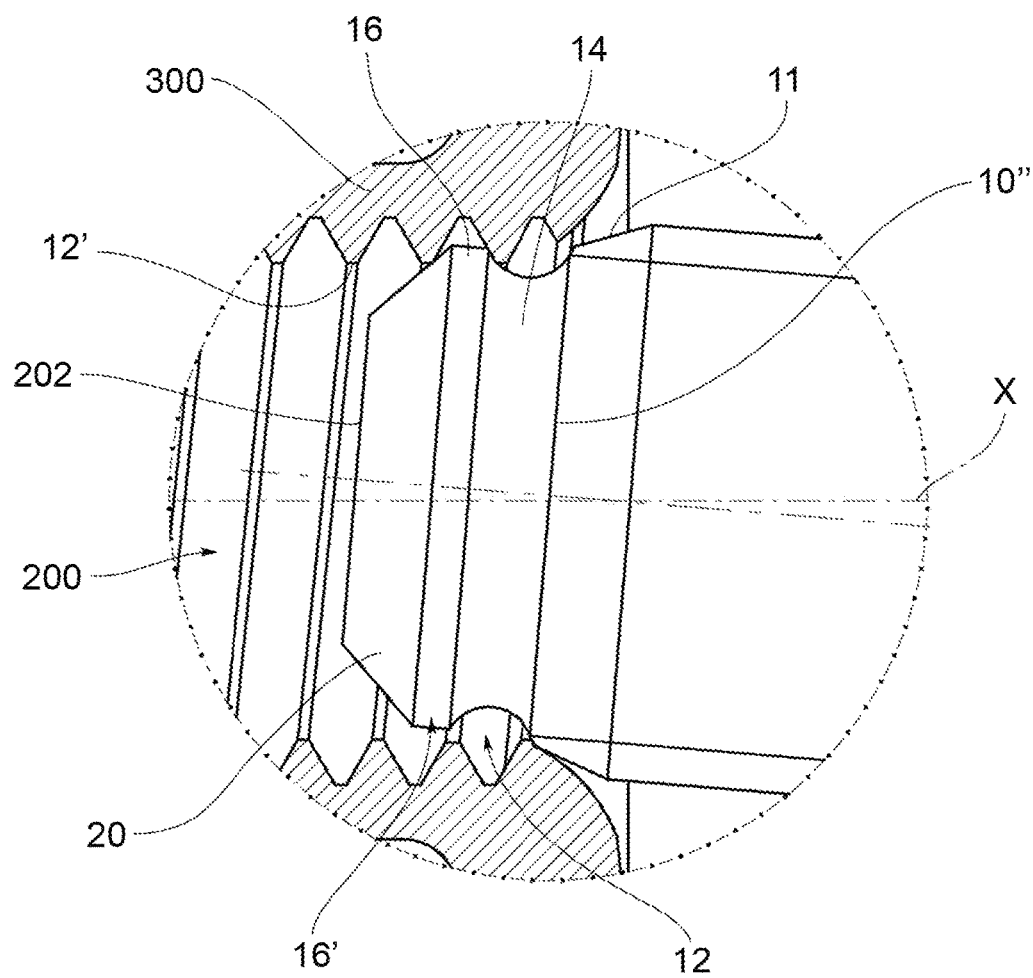
FIG. 2a is an enlarged view of the detail "A" circled in FIG. 2.

For example, in the embodiment with a single annular groove 14, as shown in FIG. 2a, the lower part of the inclined end portion of the threaded stem 10 rests on the lower part of the edge that delimits the opening of the threaded hole. For example, in this configuration, the threaded pin is inclined by approximately 10° with respect to the horizontal axis.

Figure 6:
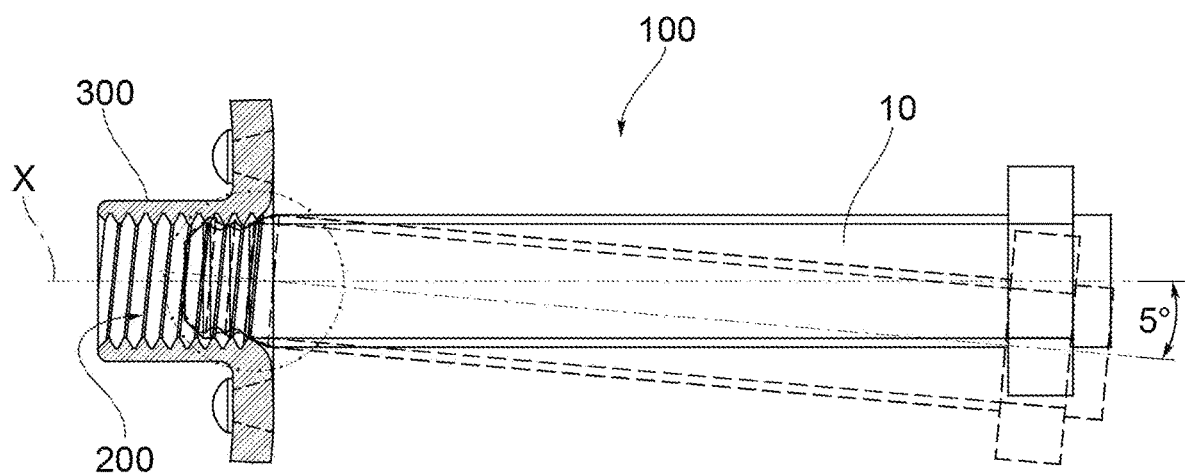
FIG. 6 shows the threaded pin of FIG. 5 coupled to a component wherein a threaded hole is made, in the absence of screwing between the threaded pin and the threaded hole.
Figure 6A:
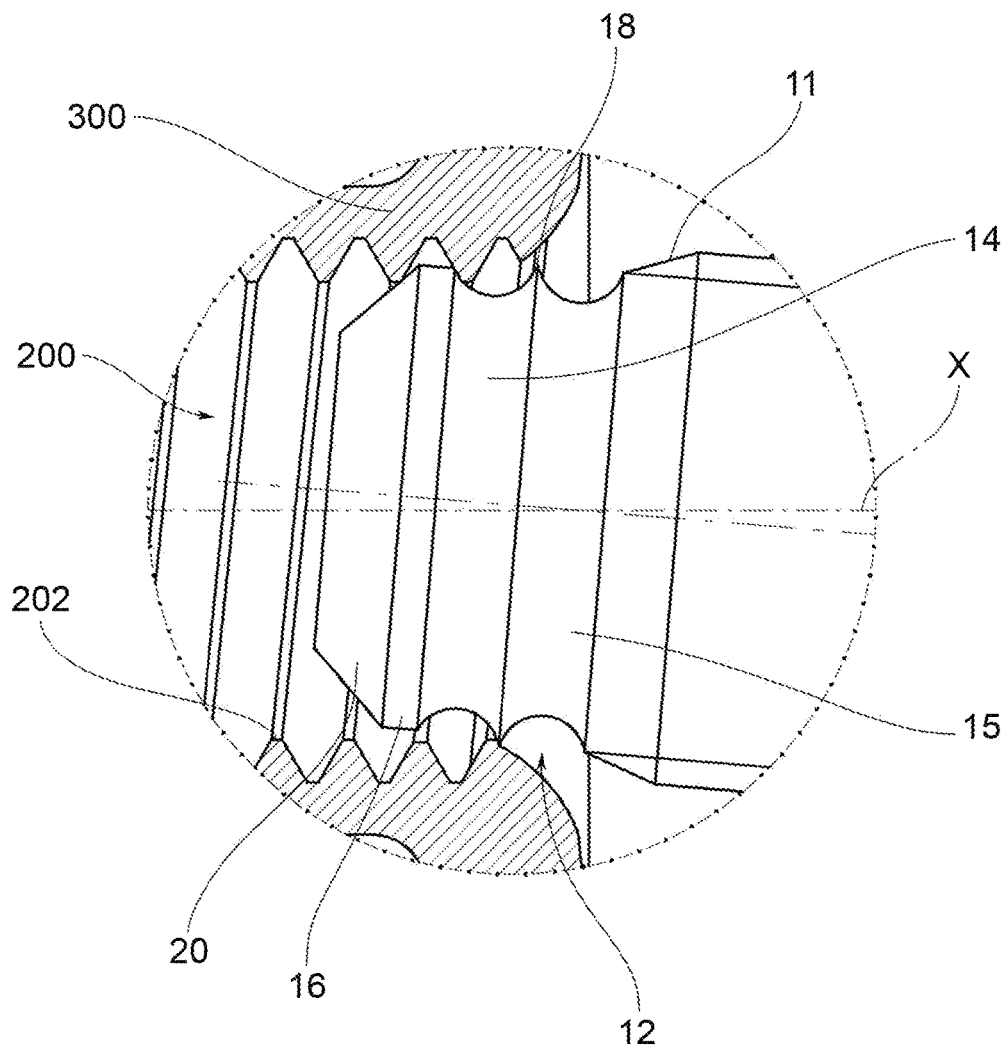
FIG. 6a is an enlarged view of the detail "A" circled in FIG. 6.

In the embodiment with two annular grooves 14, 15 as shown in FIG. 6a, the lower wall of the intermediate ridge 18 rests on the lower part of the edge that delimits the opening of the threaded hole. For example, in this configuration, the threaded pin is inclined by approximately 5° with respect to the horizontal axis.

Obviously, the presence of two or more annular grooves 14, 15, if on the one hand requires a greater machining of the threaded pin 100 and a greater axial extension thereof compared to the case of a single groove, on the other, it allows an even more stable coupling to the threaded hole to be obtained.

For example, with reference to FIGS. 4-4b and 8-8b, which show the threaded pin coupled but not screwed to the hole during a downward rotation of the female component 300, the pin with only one annular groove will remain coupled to the hole up to an 80° angle with the horizontal axis, while the pin with two annular grooves 14, 15 will remain coupled to the threaded hole 200 up to an angle of about 85°.

Figure 3:
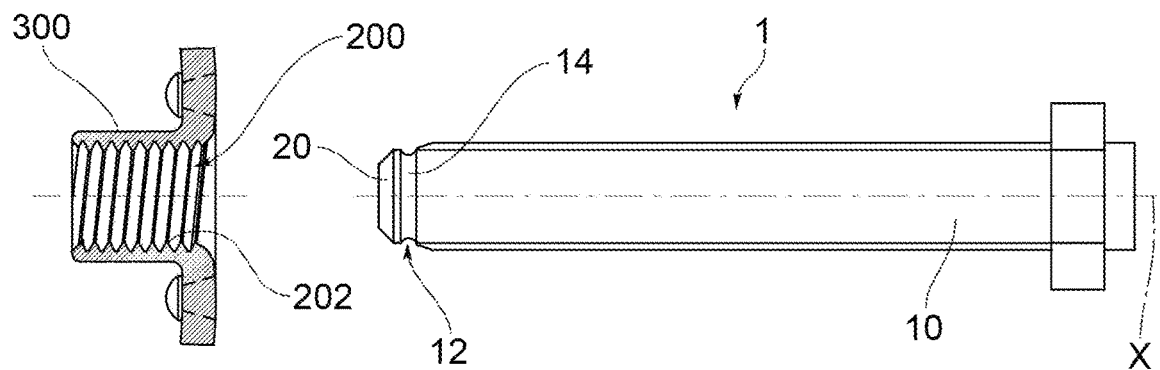
FIGS. 3-3c illustrate the steps of the operation of coupling the pin to the threaded hole.
Figure 3A:
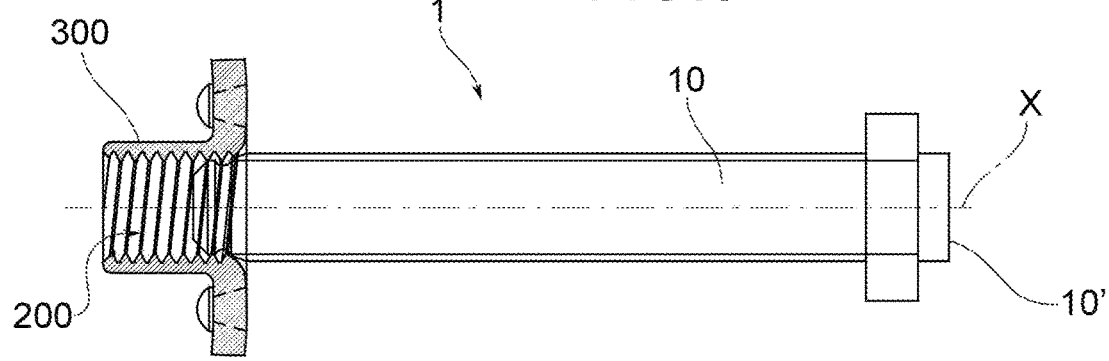
Figure 3B:
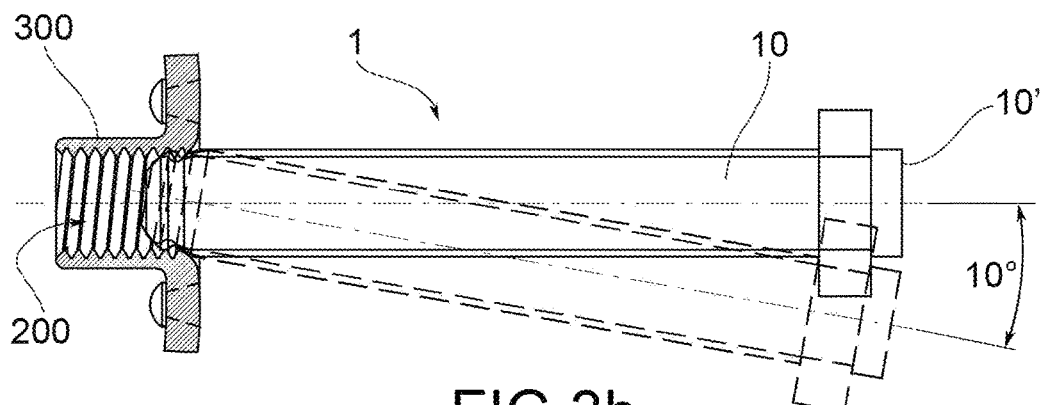
Figure 3C:
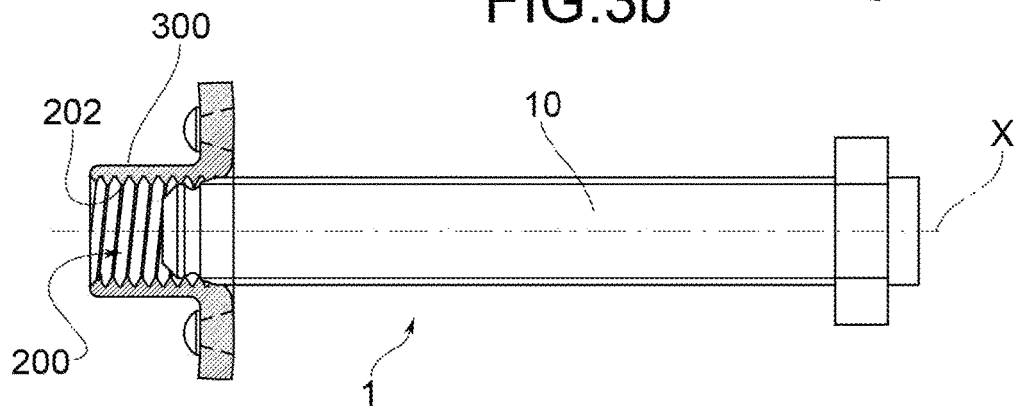
Figure 5:
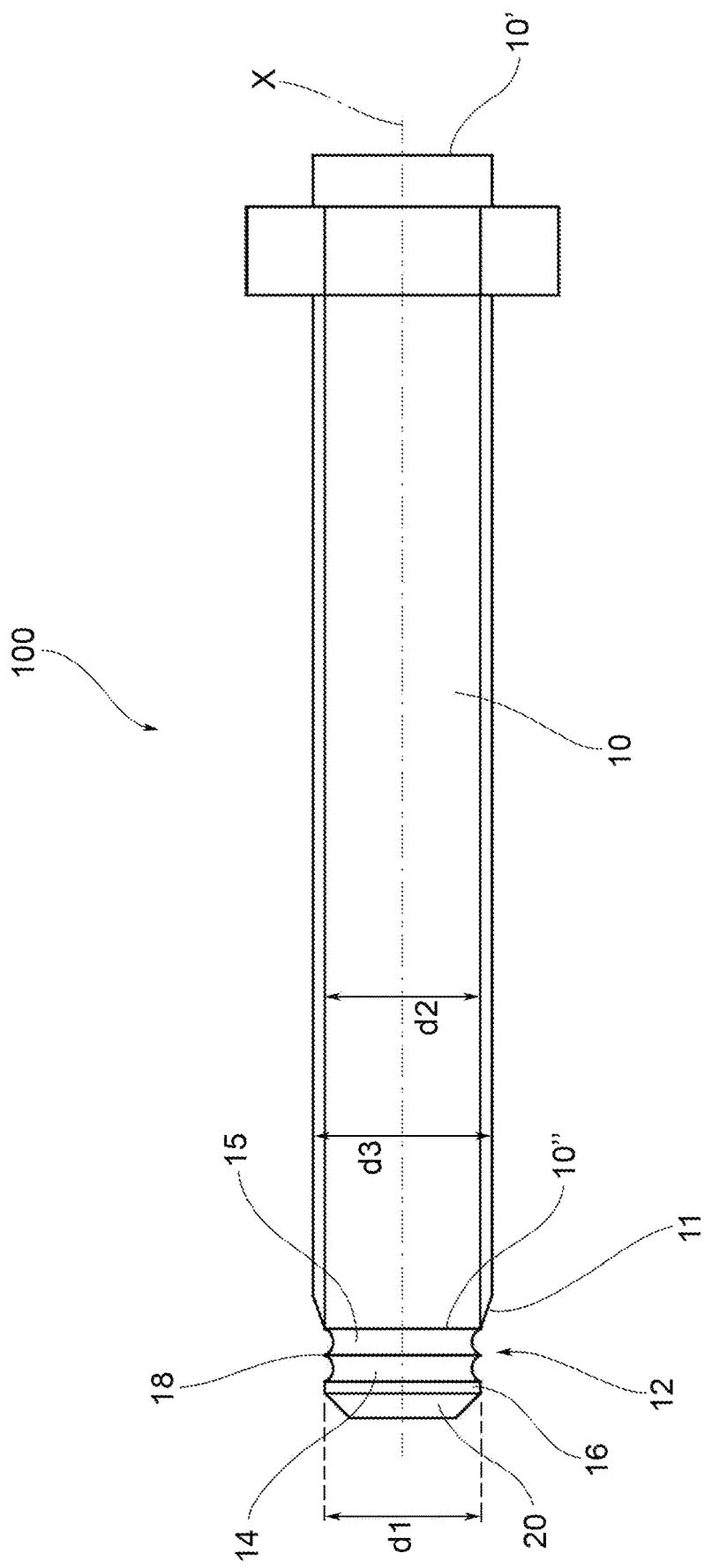
FIG. 5 is a side view of the threaded pin according to the invention, in a second embodiment.
Figure 7:
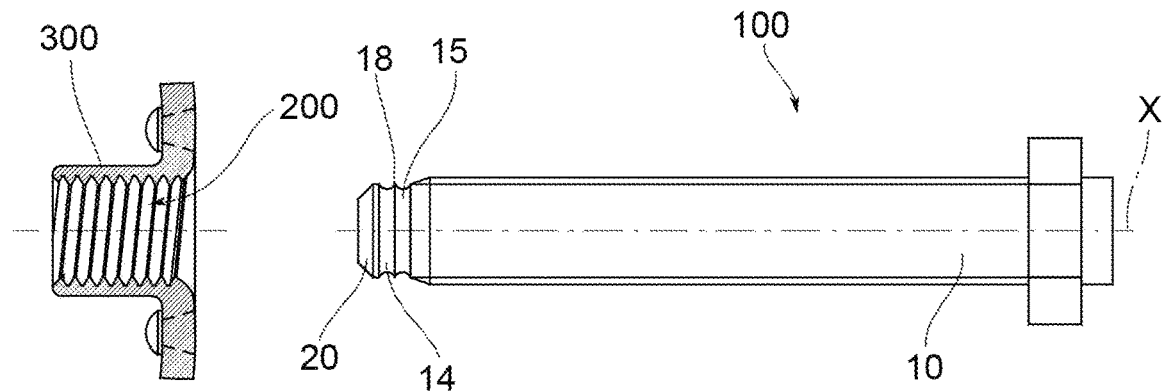
FIGS. 7-7c illustrate the steps of the operation of coupling the pin of FIG. 5 to the threaded hole.
Figure 7A:
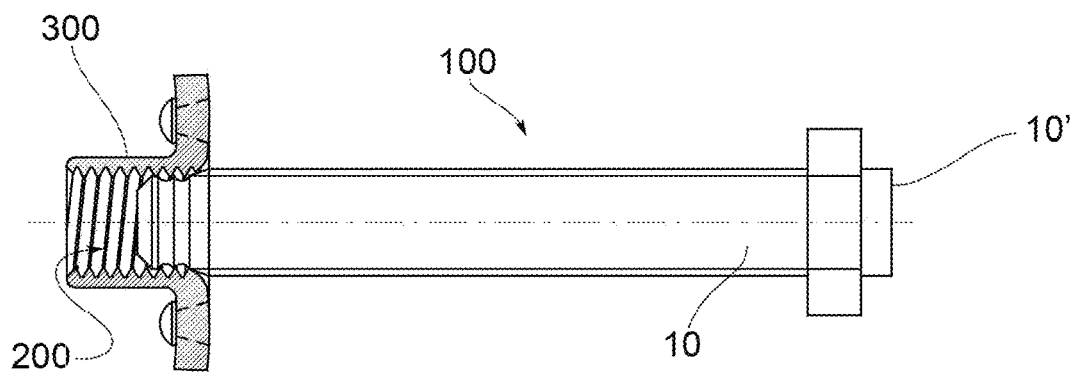
Figure 7B:
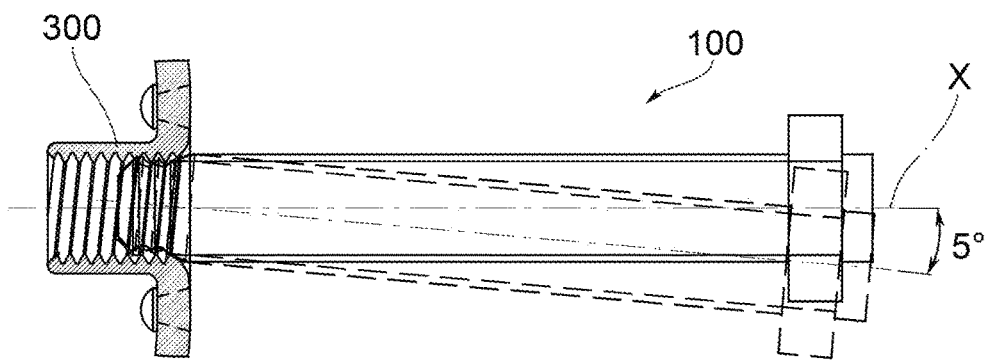
Figure 7C:
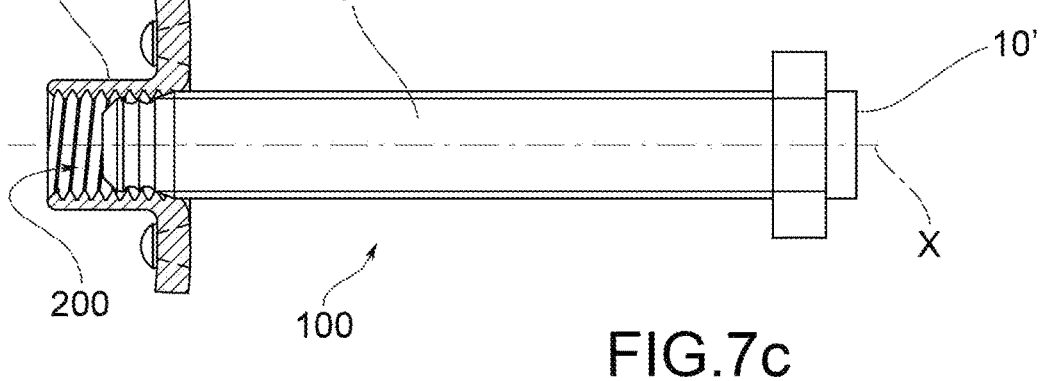

Therefore, with reference to FIGS. 3-3c and 7-7c, the threaded pin 1; 100 is axially approached to the threaded hole 200 until the distal stem end 10" abuts against the first ridge 202 of the female thread of the threaded hole 200 (FIGS. 3, 3a, 7, 7a). At this point, the coupling end portion 12 is fully inserted into the threaded hole and the threaded pin may be released. (FIGS. 3b, 7b). The pin tilts and remains coupled to the female component 300. To realign the threaded pin 1; 100 to the threaded hole 200, it is sufficient to rotate the pin, for example by one turn (FIGS. 3c, 7c). At this point one may proceed with the complete screwing of the pin to the threaded hole.

To the embodiments of the threaded pin according to the present invention, a person skilled in the art may make modifications, adaptations and replacements of elements with other elements that are functionally equivalent, without departing from the scope of the presently disclosed subject matter. Each of the features described as belonging to a possible embodiment may be implemented independently from the other described embodiments.

The invention claimed is:

1. A threaded pin, comprising a threaded cylindrical stem extending between a proximal stem end and a distal stem end, and a coupling end portion extending from the distal stem end, at least one annular groove being formed in said coupling end portion distally delimited by a distal annular ridge defining a maximum outer diameter of the coupling end portion, wherein said maximum outer diameter of the coupling end portion is smaller than an inner diameter of the threaded cylindrical stem so that the coupling end portion is insertable with play into a threaded hole wherein the threaded pin is screwable, and wherein said distal annular ridge is adapted to fit between ridges of a female thread of said threaded hole, wherein at least one second annular groove is formed in the coupling end portion, consecutive annular grooves being separated by an intermediate annular ridge having an outer diameter equal to or smaller than the outer diameter of the distal annular ridge.

2. The threaded pin of claim 1, wherein all the annular grooves have a same depth.

3. The threaded pin of claim 1, wherein the annular grooves and the annular ridges of the coupling end portion develop perpendicular to a pin axis.

4. The threaded pin of claim 1, wherein the coupling end portion has a distal stem end connecting to the distal annular ridge through a conical surface.

5. The threaded pin of claim 1, wherein the distal annular ridge forms a cylindrical outer surface.

6. The threaded pin of claim 1, wherein the distal annular ridge forms a cylindrical outer surface and wherein said cylindrical outer surface of the distal annular ridge has an axial extension greater than the axial extension of the intermediate annular ridges.

7. The threaded pin of claim 1, wherein the annular groove closest to the threaded cylindrical stem is delimited by the distal stem end.

8. The threaded pin of claim 1, wherein the outer diameter of the threaded cylindrical stem decreases progressively close to the distal stem end.

9. The threaded pin of claim 1, wherein, considering the threaded hole oriented with horizontal hole axis, when the coupling end portion is inserted into said threaded hole, and in the absence of screwing between the thread of the threaded pin and the female thread of the threaded hole, the threaded pin is inclined downward at an angle of at least 5° with respect to the horizontal axis.

10. The threaded pin of claim 1, wherein, when the coupling end portion is inserted into the threaded hole, and in the absence of screwing between the thread of the threaded pin and the female thread of the threaded hole, rotating down the threaded hole from the position with the horizontal hole axis, the threaded pin remains attached to the threaded hole at least up to a rotation angle of 80° with respect to the horizontal axis.

* * * * *